United States Patent
Jackson et al.

[11] Patent Number: 6,023,460
[45] Date of Patent: Feb. 8, 2000

[54] WIRELESS COMMUNICATIONS SYSTEM AND METHOD USING A REUSABLE CONTROL CHANNEL

[75] Inventors: Allen Jackson, Penngrove; David Hochman, Nicasio; Parminder Sikand, San Rafael; Rami Hadar; Jay Klein, both of Cupertino, all of Calif.; Shmuel Arditi, Tilva; Shmuel Bachinski, Tel Aviv, both of Israel

[73] Assignees: Harris Corporation, Melbourne, Fla.; CTP Systems, Ltd., Petaha, Israel

[21] Appl. No.: 08/671,724

[22] Filed: Jun. 28, 1996

[51] Int. Cl.$^7$ .................................................. H04J 4/00
[52] U.S. Cl. ................................. 370/330; 370/478
[58] Field of Search ................................. 455/502, 509, 455/511, 517, 524, 453; 370/442, 493, 278, 280, 282, 443, 289, 509, 522, 329, 337, 330, 343, 478, 480

[56] References Cited

U.S. PATENT DOCUMENTS

| | | |
|---|---|---|
| 4,942,570 | 7/1990 | Kotzin et al. . |
| 5,193,091 | 3/1993 | Crisler et al. ........................ 455/450 |
| 5,239,678 | 8/1993 | Grube et al. ......................... 455/511 |
| 5,295,140 | 3/1994 | Crisler et al. ........................ 370/443 |
| 5,396,496 | 3/1995 | Ito et al. .............................. 370/314 |
| 5,418,838 | 5/1995 | Havermans et al. . |
| 5,420,911 | 5/1995 | Dahlin et al. . |
| 5,590,400 | 12/1996 | Lopponen ........................... 455/509 |
| 5,689,502 | 11/1997 | Scott ................................... 370/509 |
| 5,734,678 | 3/1998 | Paneth et al. ....................... 370/330 |

FOREIGN PATENT DOCUMENTS

| | | |
|---|---|---|
| 0 268 375 A2 | 10/1987 | European Pat. Off. . |
| 0 283 683 A2 | 2/1988 | European Pat. Off. . |
| 0 554 093 A2 | 1/1993 | European Pat. Off. . |
| 0 690 590 A1 | 1/1996 | European Pat. Off. . |
| 2 290 924 | 1/1996 | United Kingdom . |
| WO 94/23544 | 10/1994 | WIPO . |
| WO 95/12258 | 5/1995 | WIPO . |
| WO 95/23487 | 8/1995 | WIPO . |
| WO 97/06620 | 2/1997 | WIPO . |

*Primary Examiner*—Douglas W. Olms
*Assistant Examiner*—Kenneth Vanderpuye
*Attorney, Agent, or Firm*—Rogers & Killeen

[57] ABSTRACT

In a wireless communication system in which a base station communicates with plural mobile stations using a control channel and plural voice (or data) channels, the present invention uses the control channel as a voice channel whenever the other voice channels are in use and a request is received from a mobile station for another voice channel. The base station's use of the control channel varies as the control channel switches from a control channel to a voice channel and back to a control channel again.

9 Claims, 4 Drawing Sheets

| | | SLOT 1 | SLOT 2 | SLOT 3 | SLOT 4 | SLOT 5 | SLOT 6 | SLOT 7 | SLOT 8 | |
|---|---|---|---|---|---|---|---|---|---|---|
| | A | | $f_4$ | | | $f_9$ | | $f_{17}$ | | |
| BASE STATION | B | $f_6$ | | $f_{13}$ | | | $f_2$ | $f_3$ | | |
| | C | | $f_8$ | | $f_6$ | | $f_6$ | | $f_{30}$ | |
| ⋮ | | ≈ | | | | | | | | ≈ |
| | N | | $f_6$ | | $f_{13}$ | $f_9$ | | $f_9$ | | |

WIRELESS COMMUNICATIONS SYSTEM AND METHOD USING A REUSABLE CONTROL CHANNEL

RELATED APPLICATIONS

This application is one of a group of applications filed on even date herewith, specifically: "A Multiple Orientation, Multiple Antenna Apparatus", by Jackson, et al., now U.S. Pat. No. 5,943,618; "A System For Communicating Digital Information Between A Base Unit and Plural Mobile Units", by Jackson, et al., Ser. No. 08/671,896; "A Wireless Communications System and Method Having Dynamic Reallocation of Communications Frequencies", by Jackson, et al., Ser. No. 08/671,578; "A Method and Apparatus For Reducing Power Consumption In Wireless, Mobile Communicating Devices", by Hadar et al., Ser. No. 08/671,733; now U.S. Pat. No. 5,870,389 "A Method and Apparatus For Determining Symbol Timing In A Wireless Communications System", by Hadar, et al., Ser. No. 08/672,269; now U.S. Pat. No. 5,943,325 "A Method and Apparatus For Using Duality To Remotely Communicate", by Klein, et al., Ser. No. 08/671,727; "A Method and Apparatus For Configuring Dispersed Components In A Communications System", by Jackson, et al., Ser. No. 08/671,670; now U.S. Pat. No. 5,978,674 and, "A Multiple Use Wireless Communications System and Method", by Jackson, et al., Ser. No. 08/671,615 now U.S. Pat. No. 5,887,255. Each of the forelisted applications are herein incorporated by reference.

BACKGROUND OF THE INVENTION

The present application is directed in general to systems and methods for communicating in telephone systems and in particular to systems and methods for using portable, wireless telephones integrated with a land-based wired telephone system.

The telephone industry has experienced tremendous growth in the last few years, driven in part by the availability of relatively inexpensive cellular telephone service. In such service, telephone subscribers use portable, battery-powered, hand-held telephone instruments to communicate via RF links with a network of base stations which interface the signals on the RF links into the land-based public telephone network. In such systems, a cellular configuration is generally used in which a particular base station uses certain frequencies to communicate with portable telephones within its "cell" and adjacent base stations use other frequencies to communicate with telephones within their cells. If base stations are sufficiently distant from each other, the same frequencies may be used in both cells so long as neither the base station nor the telephones in one cell generate signals of sufficient power to carry into the other cell. In this way, a limited number of frequencies can be reused in a non-conflicting pattern which provides telephone service throughout a particular geographic area. Of course, as a telephone leaves from one cell to another, the telephone may have to switch frequencies (or "hop" to a new channel) during the middle of an on-going call to avoid broadcasting into a nonadjacent cell which is using the same frequency for a different call.

The use of cellular telephone technology has permitted broad geographic regions to be provided with the availability of many portable telephones. As the popularity of portable telephones has expanded, however, the frequencies (or "channels") have become filled. Within the limited RF bandwidth available for all the competing uses thereof, the solution to cellular overcrowding does not necessarily lie in merely adding additional frequencies or channels within each cell.

It has been proposed in the prior art to utilize smaller cells and to reduce the power of the cellular equipment so that frequencies may be reused in greater proximity to one another. Such a solution is not entirely satisfactory, however, as with much reduced power levels, the signal to noise ratios of the communications may approach levels unacceptable in telephone communications. Along these lines, the prior art has proposed making an office building, a portion of an office building or an office complex a cell site or a small cellular system. Given the crowding on the existing cellular systems, however, such proposed systems are generally limited in the number of portable telephones which they can accommodate.

In many office situations, the persons working in the offices frequently are away from their assigned duty locations for extended periods of time and may even roam throughout the office as their business needs arise. Providing telephone service to such roaming persons in the prior art often meant using call-forwarding schemes or the like to automatically route the call from one location to another. Such systems usually required substantial user input to implement, a drawback in a typical office environment Thus, it is desirable to utilize portable or cellular technology for persons within an office. In a typical office building, the addition of cellular telephones to the already-present land-based system, such as a Private Business Exchange (or "PBX") provides some mobile communication but is insufficient for effective communication. Generally, the portable telephones are tied to a base unit which integrates the RF communications of the cellular system with the public land-based telephone system and not directly with the business person's own PBX. Effectively, such a solution in an office environment yields two independent telephone systems not well tied into each other or coordinated in any way. Additionally, the external structure of the building housing the office may make impractical the transmission of typical cellular RF signals to and from conventional base stations.

A solution to the desire to permit workers to roam within a particular geographic space, such as an office building or a portion of an office building, yet permit such workers to continue to be reachable by the telephone system and to permit the workers to utilize the advantages of the telephone system is to integrate a wireless system with a PBX. With such an integration, incoming calls to workers can be directed by the wireless system to the worker wherever that person may be within the operating range of the system. At the same time, the roaming worker will be able to readily place telephone calls both within and without the office as readily as if sitting at his own desk on the hard-wired system. The roaming worker would also have the benefit of all of the features of the PBX (such as a personalized repertory dialer, special access to restricted circuits, etc.) no matter where the worker may be located within the office.

Desirably, a wireless-PBX system would include a portable telephone unit which is easy to use, lightweight and has an extended battery life. The latter two desires are somewhat at odds with each other inasmuch as battery life often has a direct relation to the size (and weight) of a battery. Accordingly, it is often important in the design of portable units that they be as power-efficient as possible.

Within prior art cellular systems it is known for a particular base station to have associated therewith one or more control channels and several or numerous voice channels. The control channels are used to communicate with the control portions of the portable units to coordinate the use of voice frequencies and to perform an analog of typical central office functions (e.g., dialing a number, ringing the portable unit, etc.). When all of the voice channels within a base station are being utilized, there may no longer be a need for a control channel as there are no more control tasks to be performed until one of the voice channels again becomes available. In such systems, it is desirable to not waste the non-functioning voice channel and an additional voice channel can be obtained to enlarge system capabilities over conventional systems with no additional hardware costs and no additional bandwidth being occupied by the system.

Accordingly, it is an object of the present invention to provide a novel system and method to integrate a wireless telephone system into a private branch exchange or similar office telephone system It is another object of the present invention to provide a novel system and method to utilize every available channel of a wireless system for voice (or data) messages.

It is yet another object of the present invention to provide a novel system and method for reducing power consumption within a portable unit without reducing capabilities of such a unit.

It is still another object of the present invention to provide a novel system and method which can be installed in an office environment without extensive wiring and/or substantial programming.

It is a further object of the present invention to provide a novel system and method of providing an integrated wireless-PBX telephone capability using housings which can be readily mounted on existing wall or ceiling surfaces of an office.

It is yet a further object of the present invention to provide a novel system and method of communicating in a wireless system in which base stations may readily be added to the system (or reset after a power outage) and brought on-line without extensive programming.

It is still a further object of the present invention to provide a novel system and method for accurately and efficiently communicating between plural wireless telephones and plural base stations These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
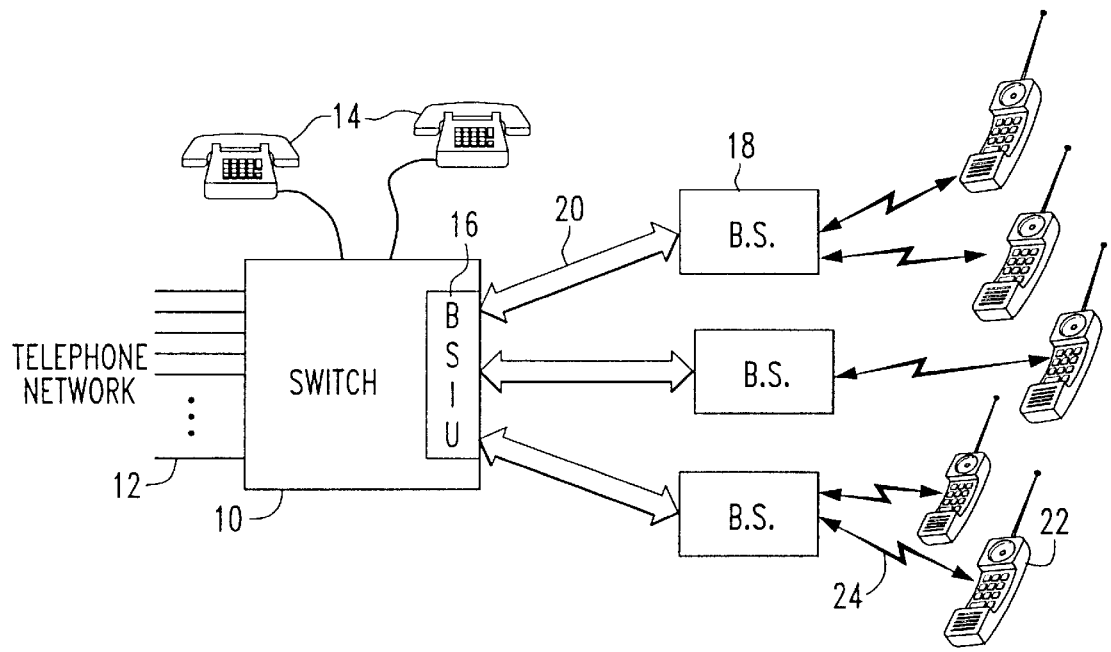
FIG. 1 is a simplified functional block diagram illustrating an embodiment of the system of the present invention.

With reference to FIG. 1, a telephone system using the present invention may include a switch 10 which is connected to plural lines or trunks of a standard telephone network such as the public telephone network in the United States. The switch 10 is also connected to plural land-based telephones 14 via wires or similar non-propagating media. The switch 10 may also be connected through a Base Station Interface Unit ("BSIU") 16 to one or more base stations 18 through a base station connector 20. Each base station 18 includes means for wireless communications with plural portable telephones 22, as described further below.

In operation, the switch performs as a standard telephone switching unit such as a PBX, a PABX, key-system or the like and functionally interconnects telephones 14 with the public telephone network. Such a switch 10 could be a switching unit such as the unit sold by Harris Corporation as the "Harris 20/20" Depending on the scope and complexity of the switch, it may have many features available to assist the telephone user with his calls including memory dialing, call forwarding, voice mail answering and delivery, and the many other features common on modern telephone switches.

One of the tasks accomplished by the switch is the mapping of in-bound or intercom telephone calls to a desired telephone instrument and the provision of "outside lines" to system telephones upon request. If an in-bound call is bound for one of the land-based telephones 14, the switch 10 conventionally rings the desired telephone through a wire connection and establishes a voice communication path along the same or another wire connection between the desired telephone 14 and the outside line on which the call was received.

Calls received by the switch 10 destined for portable telephones 22 are routed to the BSIU which sends the appropriate control information to the base station currently controlling the portable telephone 22 through methods described below. When a call is to be connected between portable telephone 22 and another telephone, the switch 10 operates to direct the voice circuit to the BSIU 16, which in turn directs the voice circuit to a selected base station 18, which in turn sends information regarding the voice message on the voice circuit to the desired portable telephone 22 via a wireless link 24.

As is well known, telephone voice circuits can be either analog or digital. In one conventional system, the telephone lines arriving from the telephone network may be analog lines. Through conventional switch circuits, the switch 10 may route the analog voice circuits arriving from the telephone network to the land based telephones 14 in either analog or digital modes. If a digital switch is being used, the switch 10 may first convert the voice information arriving from the analog telephone network to a series of digital bits and communicate those bits by conventional means to the land-based telephones 14. Communications arriving from a digital land-based telephone 14 destined for the telephone network 12 may be transmitted from the telephone 14 to the switch 10, converted to an equivalent analog signal and impressed on the lines from the telephone network 12.

The present invention is not limited to use with only analog switches or only digital switches and the inventive concepts disclosed herein may readily be implemented in association with either analog or digital switches. Nor is the present invention limited to use with a PBX or similar "stand-alone" equipment but may be applied to any telephone system or sub-system in which it is desired to integrate a wireless telephone with other telephones, wireless or landbased. Thus, the switch 10 may itself communicate with the "external" telephone network 12 through any conventional means, not limited to wired systems, such as via microwave links. Thus, while the descriptions of a preferred embodiment may describe a particular signal within a switch 10 as being a digital signal or an analog signal, the invention is not limited to systems having only such signals, the description being merely illustrative and not limiting.

Analog telephone calls from the telephone network 12 destined for one of the portable telephones 22 may be converted to a digital form within the switch 10 and are passed to the BSIU 16. At the BSIU, the digital information from the call may be combined with similar digital information from other calls and passed via the communication links 20 to the base station 18 then handling the call. In turn, and in a method discussed below, the base station 18 may communicate the digital information from the telephone call to the desired portable telephone 22. Note that as the present system is a telephone system, there exists a return path for the telephone call which simply reverses the flow described above to provide the digital form of the voice applied at the portable telephone 22 through the base station 18 and the BSIU 20 to the appropriate line from the telephone network 12. If the telephone network line is an analog line, the digital form of the return signal will be converted to the analog form for impression on the telephone network line 12.

As is well known, even though a voice message may be thought of as continuous, the digital form of such a message does not need to be a continuous stream of digital bits. Rather, if the digital equipment is sufficiently fast, clusters of digital bits representing the voice signal may be transmitted together followed by a period of time before another cluster of bits must again be sent. If the series of clusters of digital bits arrives within a certain latency period between clusters when the digital signal is converted back to analog, a user listening to the received analog signal cannot detect the fact that the voice message was transmitted in separate portions. The present invention utilizes this fact to permit multiple portable telephones to simultaneously time-share a single frequency or channel between a base station 18 and a portable telephone 22.

Figure 2:
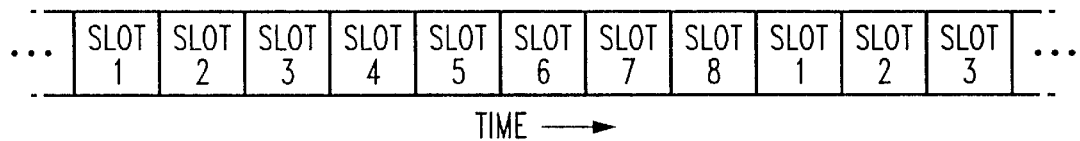
FIG. 2 is a timing diagram showing the relationship of frames and slots which may be used within the communication system of the present invention.

With reference now to FIG. 2, in a form of communication known as Time-Division-Multiple-Access, plural portable telephones may share a single frequency. As depicted in FIG. 2, a particular frequency (or carrier) may be divided into plural slots, eight (8) in the system of FIG. 2. With proper coordination between a base station 18 and a portable telephone 22, the portable telephone may expect to receive its digital messages in slot 2, the slot repeatedly occurring as one of eight slots. Thus, the portable telephone 22 receives the digital data in the slot 2 as shown in FIG. 2. Seven slots after the end of the first slot 2, a second slot 2 arrives, again bearing digital data for the specified portable telephone 22. Each slot can deliver plural digital bits of data. So long as the slots repeat with sufficient frequency, the portable telephone 22 will receive the digital form of the voice message at a sufficient rate that the analog form of the message may be reconstructed accurately by a digital-to-analog conversion at the portable telephone 22. The length of time which may pass before consecutive slots must be received to avoid a loss of data depends upon how many bits are sent at one time and the frequencies of the sounds within the voice message in a well known relationship. As noted previously, a typical telephone message is two-way and thus, two slots are needed for a telephone call, one for the passage of the digital signal to the portable telephone 22 and the other for the passage of the digital signal from the portable telephone 22.

Because one telephone call occupies only two slots of the frame, the other slots are available for simultaneous usage by other portable telephones 22. Generally, the base unit uses a particular protocol to inform the portable telephones 22 which slots are to be used for a particular telephone call and to ensure that all of the communicating portable telephones are synchronized (to avoid having two portable telephone transmitting at exactly the same time which would usually destroy the signals being transmitted by both.)

Figure 3:
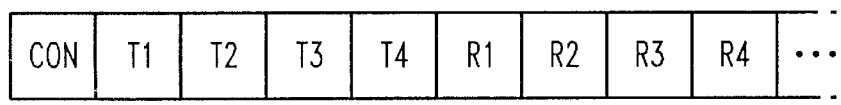
FIG. 3 is a timing diagram showing the timing of control and communications channels in a system of the prior art.

In prior art systems, typically, the first slots of a frame are used for sending voice signals from the base station to the various portable telephones then being controlled by it. For example, and with reference to FIG. 3, an 9 slot frame of the prior art may use the first slot (CON) as a control slot (for sending control messages from the base unit to the stations, etc.), the next four slots for voice signals going from the base station to the portable telephone (T1, T2, T3, T4) and the last four slots for voice signals going from the portable telephones to the base station (R1, R2, R3, R4).

Figures 4, 5:
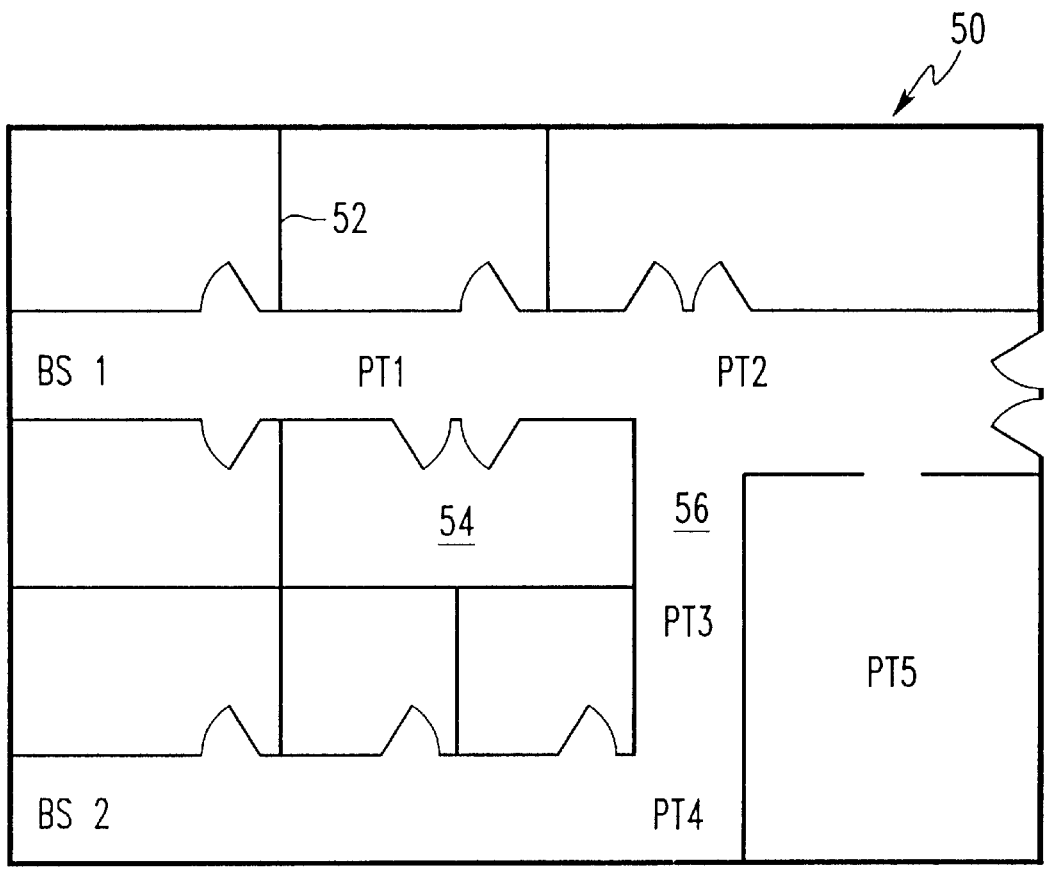
FIG. 4 is a timing diagram showing the timing of control and communication channels and the timing of receive and transmission portions of a communication frame which may be used in the present invention.
FIG. 5 is a schematic view of the interior of a building showing possible locations of persons and telephone base stations positioned therein.

In the system of the present invention, and as depicted in FIG. 4, the first slot of a frame (CON) may be used as a control slot; however, in contrast to the prior art, the remaining slots are divided into two half-slots with the base station transmitting in the first half-slot and the base station receiving (portable telephone sending) in the second half-slot of each slot.

Compared with the prior art, the use of the present invention is particularly beneficial in reducing power consumption by a portable telephone. It is known in the prior art to reduce the power supplied to the communication portions of a portable telephone when the communication portions are not expected to be needed. Thus, for example that in the prior art system of FIG. 3, a portable telephone could reduce the power to its communication portions in all but three slots, i.e., the slots when it is scheduled to transmit, to receive and to communicate within the control slot. In one aspect of the present invention, the communication portions of the portable telephone are required to be fully energized only during one slot (as explained below, the portable telephone of the present invention may not need to monitor the communication channel (or slot) while it is engaged in a telephone call. Thus, the present invention reduces the relatively inefficient periods during which power is being brought up and reduced from the communications circuits in addition to reducing the need to power up such circuits at all during fewer slots per frame.

As is known in prior art systems, the control channel can be used to establish timing for the frames of the communications system and for communicating control information between the base station and the portable telephones. For example during the periods of the control channels, the base station can transmit data informing particular portable telephones which slots and frequencies to use for their voice data or informing a particular telephone how to react to certain user entries of the telephones keypad. Also during the control slot, the system may provide a period of time during which any portable telephone seeking a voice circuit may transmit its request for such a circuit and/or may transmit other administrative data or functional requests of the base station or PBX.

With reference now to FIG. 5, the ability of a system of the present invention to provide continuous coverage of an area may be illustrated on an outline of a typical floor of an office space 50. Within the office space 50, a number of walls 52 divide the space into individual rooms 54 and corridors 56. Base Stations BS 1 and BS 2 can be placed within the office space 50 to provide telephone coverage throughout. The number and location of Base Stations depends upon the amount of telephone traffic expected and the configuration of the space to be covered. The space may be a portion of a single floor of a building, multiple floors of a building, multiple buildings, and/or external space associated with the buildings. When a user desires to use his portable telephone within the space covered by the system of the present invention, he may enter a set of instructions onto his portable telephone. By a process discussed below, the portable telephone selects a Base Station with which to communicate and sends the user's request for a voice circuit to the selected Base Station during one of the control slots associated with that Base Station. The Base Station determines which slots and frequencies are available and returns a message to the portable telephone identifying the slot and frequency to be used by the portable telephone as a voice channel. Through standard signalling techniques, the portable telephone may then transmit the subscriber number of the telephone to be dialed or request some other function of the telephone system.

By way of example and with continued reference to FIG. 5, each of the Base Stations within the system may have associated with it a frequency to be used for its control channel. When the portable telephone seeks a voice circuit or other function from the telephone system, the portable telephone may scan those frequencies known to be assigned as control channels to determine which control channel signal is received with the highest signal strength, signal to noise ratio, and/or any other metric of signal quality. The control channel signal with the best quality having been selected, the portable telephone will then initiate contact with the Base Station sending that signal via the control channel. With respect to the office space of FIG. 5, portable telephones PT1 and PT3 may be expected to communicate with Base Station 1, if that base station has an available channel, because that base station is closer than any other, otherwise portable telephones PT1 and PT2 may be expected to communicate with Base Station 2. Similarly, portable telephone PT4 may be expected to communicate with (and obtain a voice channel from) communicate with Base Station 2 for the same reasons The base station with which PT3 and PT5 would communicate cannot be readily determined from the outline of the space of FIG. 5. Note that portable telephone PT5 is physically closer to Base Station 2 than to Base Station 1; however, the direct path between the portable telephone PT5 and Base Station 2 is through a wall. Depending upon a myriad of factors, including the thickness and composition of the wall and the size of the door opening to the corridor from the room in which portable telephone PT5 is located, either Base Stations 1 or Base Station 2 (if available) might be where portable telephone PT5 lands.

Note that by the use of the selection scheme of the present invention, the assignment of portable telephones to particular base stations is dynamic and takes into account local variations in the signals communicated between the portable telephone and the base station.

In one embodiment of the present invention, incoming and outgoing telephone calls can be handled with practically the same processes at the portable telephone, the difference being only that the incoming telephone calls are preceded by a "Ring" signal. Upon the receipt of the "Ring" signal, the present invention may use the same protocol in the portable telephone for both incoming and outgoing calls.

During a telephone call at a particular portable telephone, the user of the portable telephone may be moving about the office. As the user moves, he will at some time move away from the base station controlling the call. In the system of the present invention, the portable telephone monitors the quality of the communications between the portable telephone and the base station and, upon the degradation of the signal below predetermined criteria, reselects its base station and requests that the call be moved to a new channel (or slot/frequency combination, explained below) at the base station then having the best communications with the portable telephone. For example, and with reference again to FIG. 5, a portable telephone at the location designated PT1 within the space may be expected to initially use the nearest base station BS1 (assuming that BS1 has an available channel) If the user of the portable telephone then moves during the call from PT1 to PT4, the signal between the portable telephone and its controlling base station (BS1 in this example) may degrade sufficiently to cause the portable telephone to seek a new communication path. At the position designated PT4, the portable telephone may be expected to select the nearest base station, now BS2, and obtain a voice channel from the newly selected base station. Note that in the system of the present invention, the portable telephone need not switch base stations merely because the user moves his location and another base station becomes closer and/or more direct. Rather, to avoid unnecessary hopping from one channel to another, the portable telephone of the present invention may continue to stay with its present base station so long as the quality of the voice communication remains acceptable.

The portable telephone may evaluate any characteristic of the communications channel between the portable telephone and the base station. It has been found efficient in the present invention to use the voice quality estimate typically provided by a vocoder in the transmission circuit as an estimate of signal quality. The use of this estimate for control of hopping is particularly efficient because most vocoder circuits already develop the estimate as part of their volume control operation and thus this use avoids the need for another circuit or processing function.

In the standby mode (no on-gong voice communications), the portable telephone may estimate signal quality based on the quality of the control channel from the base station. If the signal quality degrades to a predetermined criteria, the portable telephone may switch to the control channel of another base station. This technique, sometimes called soft roaming, may prevent a transient effect which can occur when a call is initiated or received by a portable telephone just before the signal quality in fact degrades to below the level needed for seeking a hop. In such a situation on a newly established call, the portable telephone may not have obtained sufficient useful call quality data on the communications channel to accurately initiate a base station/ frequency-slot switch. By using this technique during standby modes, the system of the present invention attempts to increase the probability that the portable telephone will use the best base station nearby.

By remaining in a given voice channel so long as the channel has acceptable communications, the portable unit typically does not need to monitor the control channel during a telephone call. Because the assigned slot occurs at a known repetition rate, during a voice communication the portable unit may deenergize its communication circuits except during the slot in which it is communicating. Upon the end of a slot, the portable unit can deenergize its communications circuits and set a timer to reenergize such circuits immediately before the next occurrence of the assigned slot. In the time periods between the slots, the portable telephone continues to convert any digital voice data received from the forward channel (the channel from the base station to the portable telephone) from digital to analog form for application to the telephone's speaker (or earpiece) and to accumulate digital information corresponding to any audio inputs (or user keypad entries) received during the time period between slots. When the next slot occurs, the portable telephone receives the next packet of forward channel voice data and transmits the next packet of voice data input from the user during the inter-slot periods. So long as the clocking circuits within the portable telephone remain sufficiently synchronized to the clocking circuits of the base stations, the portable telephone will be fully able to jump directly from one slot to the same slot in the next frame by use of timing circuits and without need to consult with the control channel.

Figures 6, 7:
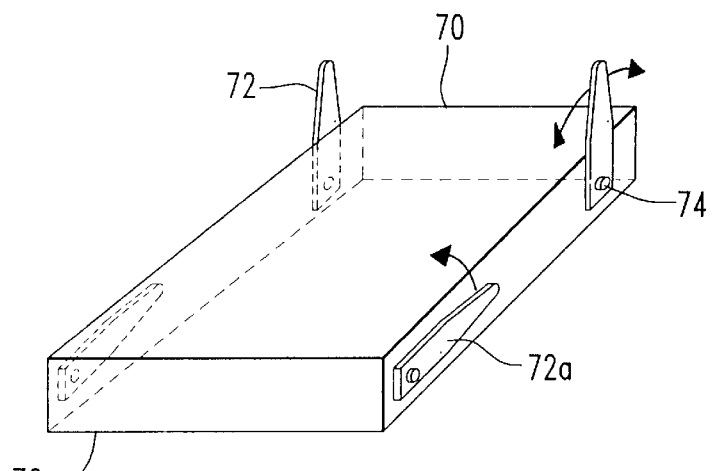
FIG. 6 is a frequency assignment table illustrating the use of carrier frequencies within an embodiment of the present invention.
FIG. 7 is a pictorial diagram of a base station housing and plural antennas in one aspect of the present invention.

With reference now to FIG. 6, in a system of the present invention, a slot or channel may be considered to be a particular slot/frequency combination. In a system having eights slots per frame, there are eight channels or communication opportunities available per frame, each "opportunity" including a forward communication and a reverse (from the portable telephone to the base unit) communication. Within a slot, the forward and reverse communications are carried out at the same carrier frequency. Thus, each base station has eight slots under its control. Each of the slots is independent of the other slots within a frame and each slot may be at any of the channel frequencies used within the system. Thus, for example for base station 2 in the system of FIG. 6, slot 1 (generally the control channel, but see below) may be the control channel operating a particular frequency, f6. At the time of the example of the system of FIG. 6, base station B also had three voice communications ongoing, one portable telephone using frequency f13 on slot 3, another using frequency f2 on slot 6 and still another using frequency f3 on slot 7. Each of the slots starts a predetermined time after the start of the frame. Thus, when a portable telephone is instructed by the base station to "use slot 6, frequency f2", the portable unit knows that it will receive forward voice data on frequency f2 the predetermined period of time associated with slot 6 after the beginning of each frame and that it is to send its reverse data on frequency f2 during the appropriate time within slot 6.

In the system of the present invention, any of the assigned frequencies may be used in any slot at any base station. Accordingly, there are no assignments of frequencies or sets of frequencies to particular base stations. This feature of the present invention provides considerable ease in installing the system, a replacement base station or a new base station. In addition, this feature of the present invention provides considerable flexibility of the system to respond to highly mobile users and shifting service demands through the geography of a given system.

In operation, a base station scans the channels assigned to the system to determine available slot/frequency combinations. By tuning to each of the assigned frequencies during its non-used slots, the base station can determine which slot/frequency combinations are not being used within its range and can assign one of those available slot/frequency combinations when a new voice channel is requested by a portable telephone. Significantly, the available slot/frequency combination data is done by each base station on a local basis. Because of the limited range of the base stations and the portable telephones, the fact that a particular slot/frequency combination is being used within the system does not necessarily mean that it cannot be used elsewhere in the system. For example, with reference to the system of FIG. 6, base station A can assign one of the portable telephones being controlled by it to use slot 5 and frequency f9 and the same slot and frequency can be used in a relatively remote base station area such as in base station N of the system of FIG. 6. As long as the base stations and their controlled portable telephones are sufficiently remote, frequency/slot combinations can be used and reused multiple times throughout the system of the present invention, providing substantial capability for a system to handle many simultaneous telephone calls.

Generally, the system of the present invention may use the monitoring of the system during unused slots to determine whether a slot/frequency combination is available to it. If the base station cannot detect the on-going use of a particular slot/frequency, that slot/frequency may be considered "available" despite the fact that a relatively remote portable telephone and base station are using the same slot/frequency combination. In such a system, it is possible that even though a particular base station is sufficiently remote from a particular use of a slot/frequency combination that it believes the combination to be available, the portable telephone being controlled by that base station may receive interference from the "remote" use of the same slot/frequency combination. However, because, as noted previously, the portable telephone is monitoring the quality of the voice signal being communicated during its assigned slot, such interference if it occurred would cause the portable telephone to initiate a hop to another frequency/slot combination at the same or another base station In yet another aspect of the present invention, the capacity of the system to carry telephone calls may be improved by the use of disappearing control channels at each of the base stations. When all of the non-control channels are being used for on-going telephone calls, the base station is free to assign its control channel as a voice channel. As noted earlier, once a telephone call is established on one of the slots, the portable telephone with that call has no further need to use the control channel of the base station. If all of the "normal" voice channels are filled and only the control channel remains at a base station, once the base station assigns that channel as a voice channel, there simply is no need for a control channel at that base station so long as all the channels remain occupied with voice communications. Any portable telephones desiring a new voice channel within the geographic area serviced by a base station which has given up its control channel will automatically not detect the base station as being available and will select another base station with which to communicate on its control channel.

As mentioned previously, power reduction is an important consideration in the design of the portable telephones. In another aspect of the present invention, power is reduced when a portable telephone is in a "stand-by" mode. In this mode, the portable telephone is energized but voice communications are not occurring, principally while awaiting a new telephone call or for the user to place his next telephone call. In the stand-by mode, a portable telephone in accordance with one aspect of the present invention does not monitor every frame of the communications but rather monitors every Nth frame and upon completion of the monitoring, reducing power to the communications circuits and setting a timer to re-power the communication circuits after the passage of N−1 frames. The series of N frames is called a "superframe". In this way, communication power consumption is reduced substantially, yet the telephone remains available to "answer" calls and to readily place calls upon user request.

In one known problem in the prior art in communications between plural remote devices and a base station, all or many of the remote devices attempt to communicate with the base station's control channel at approximately the same time, colliding with each other's messages and permitting few or none to successfully communicate with the base unit. Recall that in a system of the present invention, the portable units attempt to communicate with the base station by transmitting during a particular time period during and timed from the beginning of the control channel slot. If more than one portable telephone attempts to transmit simultaneously, neither may be successful. The problems associated with collisions on the control channel can be particularly troublesome immediately after system turn on or reset when all of the portable telephones may attempt to reestablish contact with the base stations To reduce the collision on the control channel, a portable telephone of the present invention uses a number assigned to it to determine in which frame of a superframe to attempt to contact the base station's control channel. The number assigned to the portable telephone may be programmed into one of its memories or may be input by way of DIP switches which can be read by the microprocessor within the telephone or any similar semi-permanent (or permanent) method. In the system of the present invention, the base station indicates in the control channel the position of each frame within the superframe. For example, if a superframe consists of 32 frames in a particular system, the control channel communication would include an indication that the successive frames numbered from 1 to 32. Portable telephones may divide the assigned number by a modulus number, usually the number of frames in a superframe, and attempt to access the control channel during the frame having the number equal to the modulus remainder. For example if a portable telephone has been assigned the number 179 in a system having 32 frames per superframe, that portable would attempt to communicate with a base unit during the 19th frame of the superframe (i.e., 179 modulus 32 leaves a remainder of 19). Note that there is no need for each portable telephone to have a unique number so long as the numbers are assigned in a fashion which spreads the attempted accesses to the control channel over the entirety of the superframe.

In the event that collisions occur on the control channel even with the advantages of the present invention, a fallback contention scheme can be used such as the scheme used in "slotted aloha" systems in which each colliding portable telephone waits a random period of time before attempting to access the control channel in the expectation that the randomness of the period will eliminate or reduce further collisions.

It is well known in telecommunications systems that electromagnetic signals transmitted from one device often do not travel directly to a receiver but follow various paths bouncing from one object or surface to another until received. Multipath is a particularly significant problem inside a building where a signal will bounce off walls, penetrate through walls and bounce off other surfaces until received. During the bouncing and at the receiving antenna, the various multipath signals combine and interfere with each other so that the received signal is usually plural copies of the original signal arriving at different phases with various cancellations within the waveform. To reduce the effects of multipath, it is known in the prior art to use plural antennas at the receiver to provide both spatial and frequency diversity. In many such systems, the receiver contains logic circuits which select the antenna having the best signal, accepting the signal from that antenna and rejecting the other signals. In other antenna diversity systems in the prior art, the receiver's circuitry attempts to combine the signals appearing at the diverse antennas. Usually in the prior art, the latter systems have provided better reception but at a cost of increased complexity and circuitry.

The problems associated with multipath are often exacerbated in a portable system in which power levels are generally low (to conserve power and permit frequency reuse) and in which the portable telephone is not fixed in space. It is a frequent occurrence that the user readjusts the position of the portable telephone during a conversation, each time realigning the antenna with respect to the base station (generally internal to the telephone or fixed externally in orientation to the telephone). In addition, the user is often moving which will cause coriolis effects in the transmitted signal. Thus, it is particularly useful in portable systems to use a diversity of antennas at both the base station and the portable telephone.

In another aspect of the present invention, the system of the preset invention uses "duality" to improve signal reception. With reference to FIG. 7, each base station 70 may include plural antennas 72 associated therewith. During each slot in which the base station is communicating with a portable telephone, the portable telephone first communicates with the base station. During the preamble portion of the communication from the portable telephone to the base station, the portable telephone includes within the preamble a predetermined bit pattern which the base unit uses to test the reception on each of its antennas (four in the system of FIG. 7). The base station then uses the best antenna to receive the rest of the communication from the portable telephone During the same slot, the base station has an opportunity to communicate forward data to the portable station and will use the same antenna to transmit such data as it just used to receive data from the portable unit. Because the base station transmit portion of the communication to the portable telephone immediately follows the receipt of a communication from the portable telephone and an evaluation of the best antenna to be used, it is unlikely that the portable station has changed its position such that the previously selected antenna is no longer the best one to be used between the base station and the telephone.

The base station can use the same antenna evaluation and selection for each of its slots during a frame. Thus, it is entirely possible that the base station would select a different antenna to be used for each successive slot.

It has been found by the present inventors that during antenna selection, the antennas may be switched while still measuring their signal quality. The delays inherent in the switching chain and the delays in the measurement of the received RF signal, permit testing to continue for some period of time after an antenna has been commanded to be switched out of the communication. The advantage of such a technique is the ability to test more signal data without having to dedicate more of the preamble to antenna diversity functions.

In another aspect of the present invention, the antenna selection system may select the two best antennas for a given slot, using the best antenna for transmission to the portable telephone later in the slot and evaluating the two best antenna for attenuation setting evaluation. If the signals received at the two best antennas exceed a predetermined figure of merit, an antenna can be added to the signal path during the next frame. On the contrary, if the two best signals are weaker than a predetermined figure of merit, the attenuation may be removed in the next frame. In this way, the dynamic range of the reception may be enhanced as the attenuation is selectively added or removed based on the strength of the two signals. The use of the signals from two antennas is not meant to be limiting to the invention and more signals may be used if desired, at an increased processing burden. Similarly, the figure of merit may be related to the strength of the two signals, individually or combined in a desired manner, or to any other characteristic of the received signals.

With continued reference to FIG. 7, a base station of the present invention may be housed in a housing 76 of any suitable configuration, and desirably of a configuration which blends well into typical office decor. The base station 70 may include plural independently attached antennas 74 which can be pivotally moved from a position nestled along the side of the housing 76 (as seen with respect to the antenna 72a) or perpendicular thereto (as seen with respect to the antenna 72). The antenna 72 may be attached to the housing through any conventional means which permits rotation about a pivot 74 while maintaining electrical contact between the antenna and the circuits within the housing 76. Optionally, the antenna may be attached to the housing by other conventional means which permits individual alignment such as by a ball and socket arrangement (not shown) which would permit rotation about more than a single axis. Indeed, physical attachment of the antennas to the housing is not necessary so long as an electrical path is maintained between the antennas and the base station communication circuits.

In operation, the antennas 72 of the base station 70 may be aligned in any manner which increases the ability of the base station 70 to communicate with the portable telephones. For example, in a system of the present embodiment, the base station and the portable telephones may be designed to use vertical polarization. If the base station is mounted on a ceiling, all of the antennas 72 may be swung down to the vertical to provide an orientation which matches the system design. If the base station is affixed to a vertical wall, the bottom set of antennas may be left alongside the housing 76 while the two top antennas may be swung out 180 degrees to a vertically-upward position. Similarly, the antennas may be placed independently in any position relative to the housing 76 which increases signal throughput to a portable telephone to adjust for anomalous RF propagation conditions in the geographic area near the base station 70.

Figure 8:
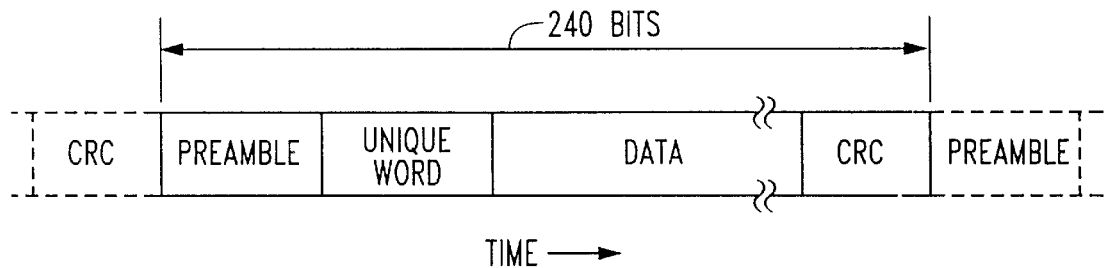
FIG. 8 is a timing diagram showing a frame which may be used in the communications portions between the base stations and the portable telephones in the present invention.
Figure 9:
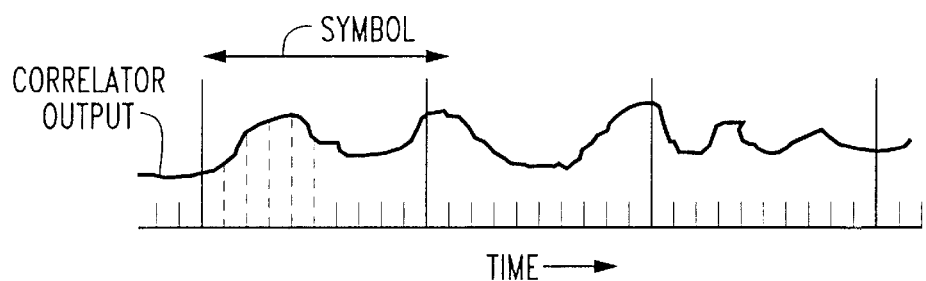
FIG. 9 is a diagram showing an exemplary chart of the output of a correlator which may be used in the present invention.

One means for implementing the signalling between a portable telephone and a base station of the present invention is illustrated in the timing diagram of FIG. 8, which depicts the functional composition of one-half a slot of the present invention The time slot may include plural bits of information, 240 bits are used in one embodiment of the present invention. The first portion of the slot comprises a preamble, which may include sufficient synchronization bits to permit the receiver to acquire the signal before the data is received. Following the preamble may be a "unique word", i.e., a predetermined set of bits which are always found at the same location in a slot. By use of a unique word at a known position within the slot, the receiver is able to synchronize its frame clock to that of the transmitter Following the unique word may occur plural "data" bits The data bits, depending upon the type of message and the on-going activity at the transmitter, may include digital voice data, control data, command data, or the like (generally referred to herein as "application" data) Finally, some type of checksum or CRC may be included to assist the receiver in ascertaining that it has received the message correctly. Generally, any type of known validation scheme may be used within the communications, including checksums, check bits, folding checksums, error correction bits, etc., realizing that there is a tradeoff between the number of bits dedicated to message validity versus the data throughput of the system.

During the preamble of the message from the portable telephones to the base units, the four antenna selection fields are included. Note that because the antenna selection bits occupy a portion of the message which is conventionally used for recovering symbol timing, symbol recovery by the base station may be degraded unless other measures are undertaken. One such measure could be to increase the size of the preamble relative to the data portion of the message or to increase the overall length of the message. Both these options entail a reduction in the data bandwidth of the system. In one aspect of the present invention, neither bandwidth reducing measure is taken but a novel method of recovering the symbol timing is used. With reference to FIG. 8, in one aspect of the present invention, the symbol timing can be obtained from the output of a correlator through which the signal is applied. In general, the received signal may be sampled to provide plural samples for each symbol. In one embodiment of the present invention, each symbol of the input signal is sampled ten times at the output of the correlator. The magnitude of the correlator output at any one time corresponds to probability that the center of the received symbol is at that time. For each ith sample within the symbol, the total of the samples is obtained and compared to the total of all the other samples, with the greatest total indicating the sample most likely to correspond with the center of the symbol. In other words, the receiver may calculate the following equation:

$$\sum_{K=1,10} \sum_{N=1+K*10, TOTAL} S_{NK}^2$$

where K equals the number of samples per symbol, and TOTAL equals the total number of samples per slot (all the symbols). Note that this aspect of the present invention uses the entire slot to determine symbol timing and then uses that determination to extract each of the symbols. To implement this aspect of the invention, the incoming message may be stored in dynamic memory while the symbol timing is being extracted; however, the symbol timing determination may begin upon initial receipt of the message and need not await receipt of the entire slot.

Once the symbol timing has been obtained the receiver of the present invention may use a "moving window" correlator to find the unique word. There is no need in the present invention for a threshold correlator. Thus, the correlator examines finite portions of the incoming signal having a length of an entire slot to determine where the unique word is most likely to be. Once the correlator has determined the most likely location, the processor of the receiver may make a bit for bit inspection to the recovered slot to determine whether each bit of the assumed unique word is present in the incoming message. If the unique word is found, the receiver may then set up all of its framing around the unique word, as it is predetermined where the unique word appears within a frame.

Once the unique word has been successfully acquired, the unique word in subsequent frames may be used to measure the drift between the transmitter and receiver and to adjust the receiver for that drift. The acquisition of the unique word in subsequent frames does not need to examine the entire frame, however, as a small window around the expected time for the unique word to appear will usually suffice and reduce the processing burden on the receiver.

To assist the base stations in maintaining synchronization with each other so that they can correctly examine slot/frequency combinations, a system of the present invention may include a common clock pulse which is sent periodically to all the base stations. The clock pulse may be derived from any relatively stable source such as from typical switch used in association with the base stations. For example, in a Pulse Coded Modulation ("PCM") system such as is often used in digital telephony applications, one of the PCM slots between the base station and the switch may be periodically programmed to carry a synchronization (or reset) pulse which is received by all base stations and used to synchronize its clock and the communication frames derived therefrom.

The use of a single stable clock helps assure data alignment and reduces the hardware costs as the base stations may not need an expensive oscillator if provided with an accurate clock from the switch. Still further, the portable telephones may use a relatively inexpensive, and relatively less accurate, on-board reference clock in the present invention by frequency correcting the reference clock using the received RF carrier from the base station (which, in turn, is locked onto the accurate clock, such as the PCM clock, from the switch).

In another aspect of the present invention, a system may include a protocol in which the remote unit, upon the initiation of the user, may invoke a bit-error-rate ("BER") test of the communications between the remote unit and a base station. This BER test may include the transmission by the remote unit, the base station or both of pseudo-random sequences. Both the base unit nd the remote may use the receipt of such sequences to determine the BER and (in the case of the base station) may report the BER to the remote unit for display to the user. The displayed BER information is very useful to system installers to determine and/or verify system coverage and performance. This aspect of the present invention is not limited to BER measurements and a system of the present invention may send signals and take signal measurements of any predetermined characteristic of the RF signal, such as signal strength.

In still another aspect of the present invention, messages between the base stations and the portable telephones may include a system identifier which has been programmed into the portable telephones. The system identifier may then be placed in the messages, for example in the preamble. Portable telephones and base stations may then examine the system identifier and if it does not match the system identifier associated with the receiver may ignore the message entirely. Thus, two totally separate systems may exist side-by-side to each other covering portions of the same geographic areas. Similarly, the portable telephones may be programmed to operate on more than one installed system and would thereby be free to roam from one system to another. Depending upon traffic and security considerations, persons may be provided with portable telephones which varied in their abilities to be accessed from various geographic areas by changing the system identifications which are authorized for particular portable telephones.

Similarly, the portable telephones of the present invention may be used on multiple wireless systems without requiring the user to initiate any action other than to energize his remote unit. (The administrator of each system providing access to the portable telephone must configure the system to accept the portable telephone.) This feature is particularly useful in installations in which different systems operate in different locations within the same (or nearby) business campus. In such an installation, the user may travel from one area of the location to another, in which a wholly different wireless system has been installed, and still have full use of his portable telephone, including the personal features associated with that user. On the other hand, if two adjacent systems do not wish to authorize the users of one system to use the other, the wireless system of the present invention automatically ignores unauthorized portable telephones and the portable telephones do not attempt to use the base stations and communications channels being used by the "foreign" system The system of the present invention may also be used simultaneously as a pager system and a telephone system. In this aspect, the portable telephones may receive an alphanumeric message for their displays and the ringer can be energized to alert the user of the message When used as a pager, the mobile station does not complete a telephone call to the user at the portable telephone but merely uses the existing communication system to forward the pager message The remote units used in a combination pager/telephone wireless system may be the same for all users, or optionally, some of the units used exclusively for paging may be reduced-cost units lacking the voice communications capability.

With reference again to FIG. 1, installation of the system of the present invention may be made relatively easy by its architecture. For example, the switch may be a digital switch having associated therewith a BSIU 16 capable of communicating with the base stations 18 through a communication means 20. The communication means 20 may be as simple as two sets of twisted wires, two of the wires being used for transmission of data to the base station 16 and two of the wires being used for transmission of data to the BSIU 16. The transmission of data on the four wires can be made using a protocol known as E-1 to handle the plural digital messages which may be simultaneously occurring on each pair of wires. In addition, the four wires could also carry power and ground references to the base stations so that integration of the base station into a buildings electrical wiring is not necessary.

In operation, a base station 18 can be mounted on any convenient surface, such as a wall or ceiling, and four wires carried between the base station 18 and the BSIU 16. By use of a generalized power-up Programmable Read Only Memory ("PROM") associated with the base station 18, the base station 18 may boot itself using the PROM upon the application of power from the communication means 20 or from the available electrical wiring. Once the base station 18 has booted, it may then send a message to the BSIU requesting a download of the system unique data and configuration. Because the base station 18 does not have frequencies assigned and operates primarily on an evaluation of signal strength rather than telephone location, no extensive programming of the base station is generally necessary. This lack of programming necessity makes installation of the system easier and provides for automatic resumption of service after a power failure or surge.

Figure 10:
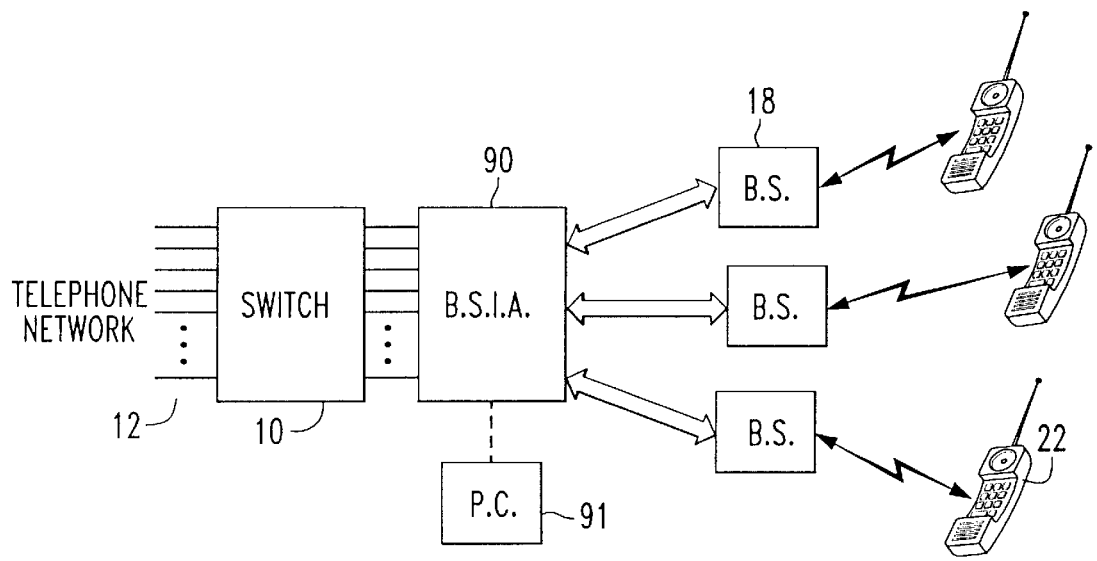
FIG. 10 is a simplified functional block diagram illustrating another embodiment of the system of the present invention.

In still another embodiment of the present invention as depicted in FIG. 10 (using common reference numerals as used in FIG. 1 for common elements), a switch 10 used in the present invention need not be a digital switch as described above but may be a conventional analog switch which interconnects the public telephone network 12 to the system. In such a system, a Base Station Interface Apparatus ("BSIA") 90 may be used to interface between the digital wireless system and a conventional analog switch 10. The BSIA provides the wireless system (the base stations 18 and portable telephones 22) with all of the functions of the BSIU described with respect to FIG. 1. Additionally, the BSIA of the alternative system of FIG. 10, converts all of the digital communications to and from the portable telephones to conventional analog communications and may convert function requests from the portable telephones 22 into standard switch (e.g., PBX) protocols and signalling. Alternatively, the BSIA 90 may cause some of the functions to be implemented directly by the portable telephones by appropriately programming the portable telephones 22 (as explained below) to take specific, PBX-related actions in response to specified user inputs.

With continued reference to FIG. 10, the BSIA may be configured and controlled through a standard personal computer 91 or similar computing device which may be removably attached to the BSIA 90 when desired. The personal computer could be connected, for example, when the system administrator wanted to make configuration changes, initiate tests or gather data regarding the system's performance. Software within the personal computer 91 would typically include software for: System Configuration, Uploading, Analysis of Performance Statistics and Alarms, and Downloading of New Programs to the BSIA and base stations. New or updated programming for the base stations may readily and conveniently be implemented by downloading such programs into the BSIA for communication to the base stations (or through the BSIU in systems such as in FIG. 1). Thus, reprogramming of new and improved features does not require removal or access to the base stations, resulting in significant savings for personnel in maintaining installed systems.

The BSIA (or the BSIU) may also include the capability for the portable telephone user to execute macro commands by simple, brief keying actions In the macro capability, the BSIA may provide signals necessary for the protocol to the switch to be readily implemented by a single keystroke on the portable telephone. For example, if a certain function in the switch required the successive transmission of the DTMF signals for the numbers 1, 2 and 3, a single function key on the portable telephone could be used to signal the BSIA that the exemplary function was desired The BSIA, in turn, would cause the DTMF signals for the numbers 1, 2 and 3 to be successively transmitted to the switch. The switch receives the DTMF signals, understands that the requested function is desired and performs the actions conventionally necessary to perform the requested function. A set of macros may be programmed into the BSIA, some of which are portable telephone dependent, so that the same key on different telephones may cause different signals to be sent to the switch. Still further, differing sets of macros may be developed for different types of switches to accommodate the differences in the switch protocols and the appropriate set downloaded into the BSIA during installation.

In another aspect of the present invention, the portable telephone may include a display which can be programmed from the switch (through the base station) to customize features for the various telephones within a system After the system has been installed and energized, message may be sent from the switch to the telephone to provide certain features within the telephone and may control the appearance of the display on the telephone. For example, the display of the telephone can be made to resemble the keypad and switches of a conventional land-based telephone. By specifying the functions available to the telephone user, the switch may make the switches of one telephone operate wholly different functions than the switches at other telephones and may cause the telephone displays to show different images indicative of the functions programmed. For example, in a telephone display which had five virtual switches thereon, the top switch on one telephone could be used for a "hold" feature and on a different telephone could be used for a "transfer" feature. Accordingly, the display on the first telephone could be commanded to display "hold" within or near the image of the switch on the telephone's display while the second telephone could be commanded to display "transfer" at the same location on the display. Changes to the display and features of the various portable telephones used in the system can be readily made centrally using the switch and the command structure of the present invention. In addition, if the portable telephone user is required to provide a user-related code, each telephone could change its appearance and functions responsively to the user code and the same telephone would have different features depending upon the security level or service level of the user.

The display may use both the familiar alphanumeric messages of present cellular telephones and icons, i.e., graphical images which suggest and represent certain states and actions such as "e-mail waiting", battery strength, speaker volume level, line status, etc.

An embodiment of the present invention may also be configured to utilize one or more user interface characteristics described below to make the remote units easier to use. For example, an embodiment of the present invention may include a user protocol in which the user may either dial the digits of telephone number to be dialed and then press an action key (such as a "CALL" key) or may first press the action key followed by the digits of the telephone number to be dialed. The first method resembles the user protocol currently common in cellular telephone systems and the second method resembles the protocol commonly used in present cordless telephones. In the present invention, the user may be provided with the option of using either protocol.

In another useful protocol which may be used in the present invention, the user may press an action key twice to redial the last telephone number dialed. For example, the user may press a "CALL" key twice, the first time obtaining dial tone and the second time redialing the previously dialed number. The use of a single key assists the user by not requiring search on the keypad for different keys to indicate Call and Redial functions.

In still another useful protocol, incoming telephone calls may be redirected on an ad hoc basis by the user of a remote unit. In this protocol, upon the receipt of telephone call at the remote unit, the remote unit may indicate the incoming call by a standard method such as by ringing or vibrating. Optionally, the remote unit may display the telephone number or extension of the calling party. The user may respond to the incoming call by either: pressing a "Call" key to answer the call; pressing a "Clear" key to mute the ringing and leave the call unanswered; or, pressing an "End"'key to have the call automatically redirected to another unit such as another telephone, a message recording system, or a voice mail system.

In yet another protocol feature which may be used in the present invention, the keyboard of a remote unit may be electronically locked so that only a limited number of keys my be used. For example, a user may input a predetermined key sequence to lock the telephone from all use (except the unlocking functions) or to lock the telephone to a restricted state. In the restricted state, the user may be permitted to use three keys, an "Unlock" key which restores full functions, a "Power" key to turn the remote unit off, and a "Call" key to answer incoming telephone calls. With the remote unit in the restricted state, the remote unit may be freely carried about without concerns for inadvertent or unauthorized depressions of the keys.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a communication system comprising plural base stations and plural mobile telephones, a method of establishing communications between the plural base stations and the plural mobile telephones comprising the steps of:
   (a) dividing the communication medium into a time series of repeating frames;
   (b) dividing each of the frames into plural slots;
   (c) dividing the entire frequency bandwidth available to the communication system for use in communicating between the base stations and the mobile telephones into a set of frequency bands;
   (d) transmitting control information by each of the base stations in a designated one of the slots during each frame;
   (e) searching at each of the mobile telephones for the control information being transmitted by each of the base stations;
   (f) at each of the base stations, simultaneously searching for available frequency bands among the entire set of frequency bands and searching for available slots among all the slots;
   (g) at one of the mobile telephones, evaluating a predetermined characteristic of each of the signals transmitted by the base stations having control information;
   (h) at one of the mobile telephones, selecting one of the base station with which to communicate with on the basis of the predetermined characteristic; and,
   (i) at the one of the base stations, assigning a slot and frequency band combination from the frequency bands and slots available to the one of the base stations for establishing communications with the one of the mobile telephones.

2. The system of claim 1 wherein said predetermined characteristic is one or more of signal strength, signal to noise ratio, bit error rate and energy content.

3. The system of claim 1 wherein voice data may be transmitted during each the non-control slots.

4. The system of claim 3 wherein the mobile units transmits available application data to the base station before the base station transmits available application data to the mobile unit during the non-control slots.

5. The system of claim 1 wherein the predetermined characteristic is evaluated with respect to a predetermined word contained within the control slots.

6. In a communication system comprising plural base stations and plural mobile telephones, a method of establishing communications between the plural base stations and the plural mobile telephones comprising the steps of:
   (a) dividing the communication medium into a time series of repeating frames;
   (b) dividing each of the frames into plural slots;
   (c) dividing the entire frequency bandwidth available to the communication system for use in communicating between the base stations and the mobile telephones into a set of frequency bands;
   (d) transmitting control information by each of the base stations in a designated one of the slots during each frame;
   (e) searching at each of the mobile telephones for the control information being transmitted by each of the base stations;
   (f) at each of the base stations, searching for available frequency bands among the entire set of frequency bands and searching for available slots among all the slots; and,
   (g) at the one of the base stations, assigning a slot and frequency band combination from the frequency bands and slots available to the one of the base stations for establishing communications with the one of the mobile telephones.

7. The system of claim 6 wherein voice data may be transmitted during each of the non-control slots.

8. The system of claim 7 wherein the mobile units transmits available voice data to the base station before the base station transmits available voice data to the mobile unit during the non-control slots.

9. The system of claim 6 wherein a predetermined characteristic of each of the signals transmitted by the base stations having control information is evaluated at one of the mobile telephones.

* * * * *